United States Patent [19]

Mark

[11] Patent Number: 5,076,743
[45] Date of Patent: Dec. 31, 1991

[54] DEVICE FOR DRILLING UNDERCUTS

[75] Inventor: Fritz Mark, Mäder, Austria

[73] Assignee: Hilti Aktiengesellschaft, Liechtenstein

[21] Appl. No.: 528,697

[22] Filed: May 24, 1990

[30] Foreign Application Priority Data

May 31, 1989 [DE] Fed. Rep. of Germany ....... 3917603

[51] Int. Cl.$^5$ .......................... B23B 41/06; B28D 1/14
[52] U.S. Cl. ..................... 408/151; 82/171; 82/173; 175/220
[58] Field of Search ..................... 82/1.2, 1.3, 1.4, 131, 82/132, 171, 173; 408/150, 151; 175/220, 273, 263, 279, 202, 203

[56] References Cited

U.S. PATENT DOCUMENTS

| 2,871,731 | 2/1959 | Stuber | 408/151 |
| 3,146,641 | 9/1964 | Benjamin | 408/151 |
| 3,233,480 | 2/1966 | Briney | 408/151 |
| 3,250,155 | 5/1966 | Armstrong | 408/151 |
| 4,759,152 | 7/1988 | Berger | 51/120 |
| 4,930,585 | 6/1990 | Noser | 409/151 |

Primary Examiner—James G. Smith
Assistant Examiner—B. Shideler
Attorney, Agent, or Firm—Toren, McGeady & Associates

[57] ABSTRACT

A device for drilling an undercut in a borehole formed into a substrate includes a housing (1) containing a guide sleeve (2) with a bushing (4) arranged eccentrically within and rotatable relative to the guide sleeve. A torsion spring (6) is located between the guide sleeve and the bushing and is stressed when the bushing rotates relative to the sleeve. A drive shaft (8) with a cutter head (9) at one end is supported in the bushing and can be moved from a centered position into an eccentric position relative to the guide sleeve for forming the undercut. The rotational drive of the bushing (4) is afforded by the drive shaft (8) via an eccentric gear train. Furthermore, the gear train includes an internal ring gear (23) couplable to a gear train housing (19) by a wrap-around spring (31). In its stressed condition, the spring (31) can be released from outside the device so that the bushing (4) can be rotated by means of the eccentric gear train including the internal ring gear (23), gear wheels (20, 21) and an additional ring gear (24).

3 Claims, 3 Drawing Sheets

DEVICE FOR DRILLING UNDERCUTS

BACKGROUND OF THE INVENTION

The present invention is directed to a device for drilling undercuts in boreholes in a substrata and includes a housing abutting against a surface of the substrata, a guide sleeve with an eccentric bore parallel to the axis of the guide sleeve, and a bushing supported in the guide sleeve bore so that it can be rotated through a limited arc of about 180° relative to the guide sleeve. A drive shaft with a cutter head is rotatably supported in the bushing. A torsion spring is located between the guide sleeve and the bushing and is stressed by relative rotation between the guide sleeve and bushing. A releasable member affords rotary arrest between the guide sleeve and the housing. An eccentric gear train within a gear train housing includes an internal ring gear connected with the gear train housing and positioned between the drive shaft and the eccentric bushing.

A drilling device is disclosed in DE-P 39 03 889.0 in which the eccentricity of an eccentric bushing corresponds approximately to the eccentricity of a bore in the guide sleeve. In an initial position, these eccentricities cancel one another, whereby the drive shaft is located centrally relative to the guide sleeve. In this position, the drilling device can be introduced into a borehole and, subsequently, the drive shaft can be powered from the outside. The eccentric bushing is turned by an eccentric gear train. Entrainment of the guide sleeve is initially prevented by the releasable arrangement for rotary arrest, so that relative rotation takes places between the eccentric bushing and the guide sleeve due to the stress of the torsion spring. After the eccentric bushing has been displaced through 180°, the drive shaft within the bushing has achieved its maximum eccentricity and the cutter head can penetrate into the surface of the borehole. The arrangement providing rotary arrest of the guide sleeve is released, whereby a circumferential undercut is formed as the eccentric bushing continues to rotate. When this process is completed, the guide sleeve moves relative to the eccentric bushing, while the stress in the torsion spring is released. Accordingly, the drive shaft returns to the initial central position with respect to the guide sleeve and the drilling arrangement can be removed from the borehole.

Rotation of the guide sleeve relative to the bushing can be hindered by friction in the borehole with the result that the drive shaft remains in an eccentric position relative to the guide sleeve and the drilling device cannot be removed from the borehole because the cutter head projects radially outwardly from the guide sleeve.

SUMMARY OF THE INVENTION

Therefore, the primary object of the present invention is to provide a device for drilling undercuts assuring relative rotation of the guide sleeve and the eccentric bushing for returning the bushing to the initial centered position.

In accordance with the present invention, a releasable interconnection element affording rotational arrest between the ring gear and the gear train housing is provided, with one internal ring gear being rotatable from outside of the device in the released position of the interconnection element.

After releasing the interconnection element, the ring gear can be rotated relative to the gear train housing. In the gear train, there is a second ring gear connected with the bushing and it is rotated by the arrangement of the gears. As a result, the eccentric bushing can be turned or rotated from outside the device by the action of the eccentric gear train as a rigid block because of the high step-up ratio. To effect a relative rotation between the eccentric bushing and the guide sleeve, the sleeve is secured against turning in one rotational direction relative to the housing.

The interconnection element is appropriately formed as a wrap-around spring, affording a compact construction. Additionally, a wrap-around spring can be easily released and its effect cancelled by exerting a torque on one of its ends for interrupting the connection afforded by it.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
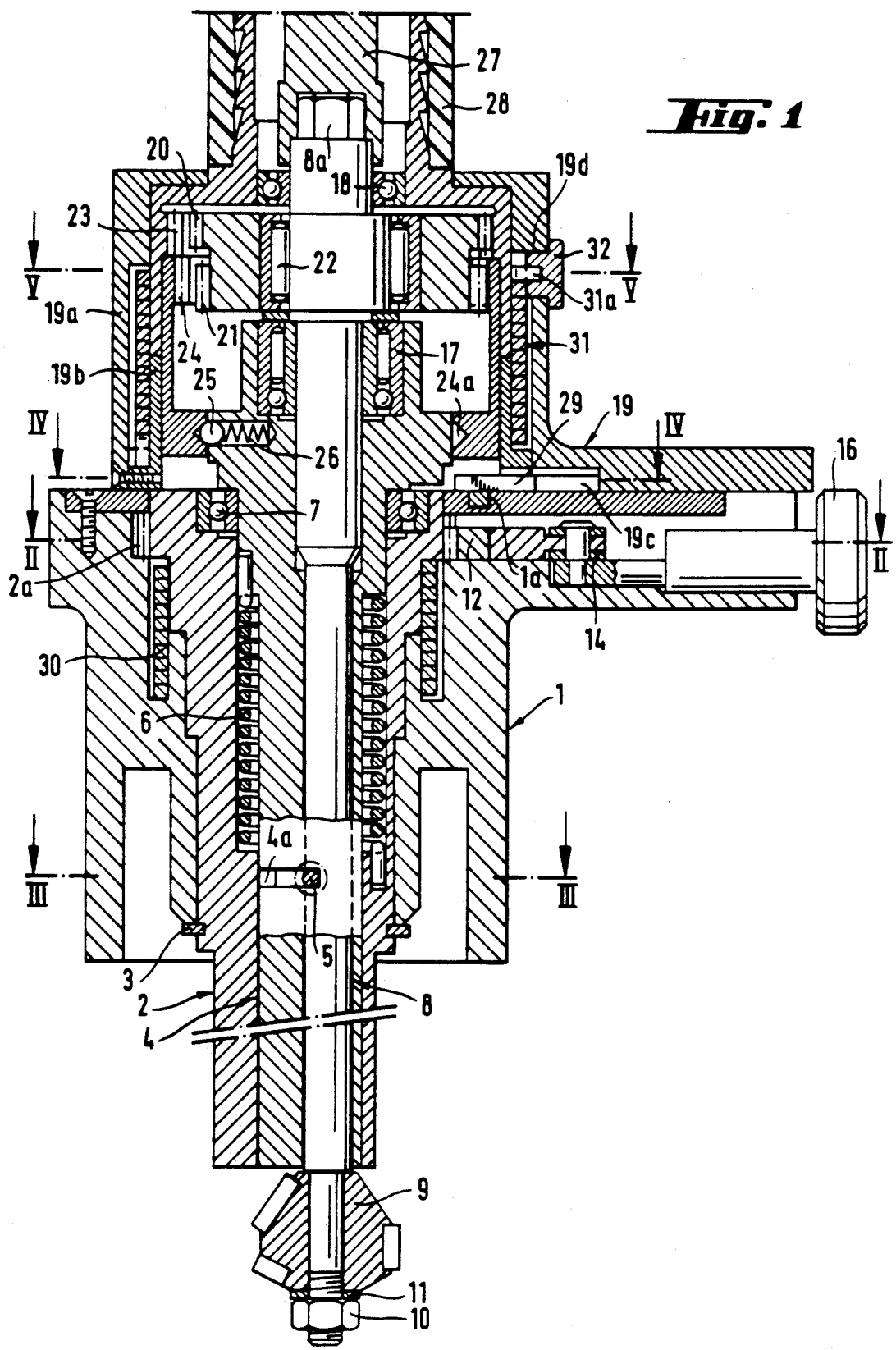
FIG. 1 is an axially extending sectional view of a device embodying the present invention.

The device embodying the present invention comprises a housing 1 having a first end, the lower end in FIG. 1, arranged to rest on a surface containing a borehole and an upper second end. A guide sleeve 2 is rotatably supported within the housing 1. Guide sleeve 2 is secured in the axial direction in the housing 1, the vertical direction as viewed in FIG. 1, by a snap ring 3 located adjacent the first end of the housing. Guide sleeve 2 has an eccentrically arranged bore in which a bushing 4 with an eccentric bore is located. Bushing 4 is rotatable relative to the guide sleeve 2 for an angular extent in an arcuately extending groove 4a, note FIG. 3. The groove 4a extends around a portion of the outer circumference of the bushing 4. A threaded pin 5, screwed into the guide sleeve 2, extends inwardly into the groove 4a for limiting the rotatability of the bushing relative to the guide sleeve. As can seen in FIG. 3, the groove 4a extends arcuately for approximately 180°. Between the first and second ends the housing, a torsion spring 6 is located between the guide sleeve 2 and the bushing 4. Torsion spring 6 is stressed or tightened when the bushing 4 is rotated relative to the guide sleeve 2. At the second or upper end of the housing 1, a ball-bearing 7 rotatably supports the bushing 4. Drive shaft 8 is rotatably supported in the eccentric bore in the bushing 4. At its lower end, the drive shaft 8 projects outwardly from the lower end of the guide sleeve 2 and the bushing 4 and a cutter head 9 is secured on the projecting end. In the position as shown in FIG. 1, the eccentricities of the guide sleeve 2 and the bushing 4 are added together, whereby the cutter head 9 projects laterally beyond the outside surface of the guide sleeve 2. In this position, an undercut can be formed in a known manner in a substrata. If the bushing 4 is turned or rotated through 180° from the position shown in FIG. 1, relative to the guide sleeve 2, then the eccentricities of the guide sleeve and bushing cancel out one another. In this second position, the cutter head moves into a centered position with respect to the guide sleeve 2, so that the device can be introduced into or removed from a borehole. Cutter head 9 is secured to the end of the drive shaft by a nut 10 and a washer 11.

Figure 2:
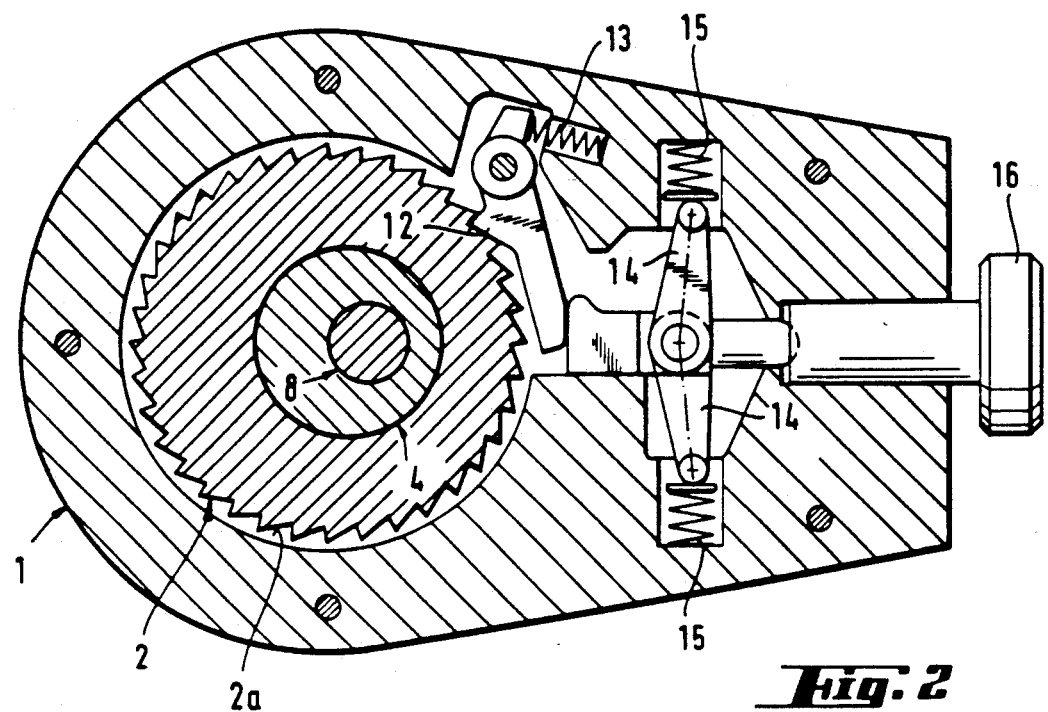
FIG. 2 is a cross-sectional view of the device taken along the line II—II in FIG. 1.

As shown in FIG. 2, guide sleeve 2 has a set of teeth 2a extending transversely of the axial direction and located in the region of the upper or second end of the housing 1. A pivotally mounted pawl 12 is shown in engagement with the set of teeth 2a. Pawl 12 has a pair of arms, each on an opposite side of its pivot point with one arm 12 contacted by a spring 13. The other arm of pawl 12 bears against a toggle lever 14. Pressure springs 15 act on each of the outer ends of the toggle lever 14. In the position displayed in FIG. 2, the toggle lever 14 holds the pawl 12 in engagement with the set of teeth 2a. If the pressure of the set of teeth 2a becomes too great, then the toggle lever snaps through the center position to the opposite side and displaces the knob 16 outwardly. Knob 16 is located on the exterior of the housing 1. In the outwardly displaced position of the knob 16, guide sleeve 2 is no longer locked and can rotate along with the bushing 4.

Drive shaft 8 is supported in the bushing 4 by a combined needle roller-ball bearing 17. Above the housing 1, an additional support of the drive shaft 8 is provided by a ball bearing 18 located in the upper end of a gear train housing 19. Gear train housing 19 includes an axially extending outer part 19a extending upwardly from the second end of the housing 1 and an inner part 19b extending upwardly from the housing with the two parts connected together.

The gear train located within the gear train housing 19 includes two gear wheels 20, 21 rotatably supported by a needle roller bearing 22 on an eccentric section of the drive shaft 8. Gear wheel 20 meshes with an internal ring gear 23 located at the inner surface of the gear train housing 19, that is on the inner part 19b. The other gear wheel 21 meshes with a ring gear 24 rotatably supported within the gear train housing 19 and connected to the bushing 4 via an overload clutch including a ball 25, a spring 26 biasing the ball into one of a number of snap-in apertures 24a, formed in the lower end of the internal ring gear 24. Gear wheels 20, 21 along with internal ring gears 23, 24 form a so-called eccentric gear train. This eccentric gear train has a very high step-up ratio because of the slight differences in diameters between the individual wheels. In the present case, the step-up ratio is approximately 1:600. At its upper end, drive shaft 8 has a hexagonal-shaped projection 8a and serves for the introduction of rotary motion to the shaft. Flexible shaft 27 drives the drive shaft 8 and is laterally enclosed by a sheathing tube 28 secured on a portion of ring gear 23 extending upwardly from the gear train housing 19.

Figure 4:
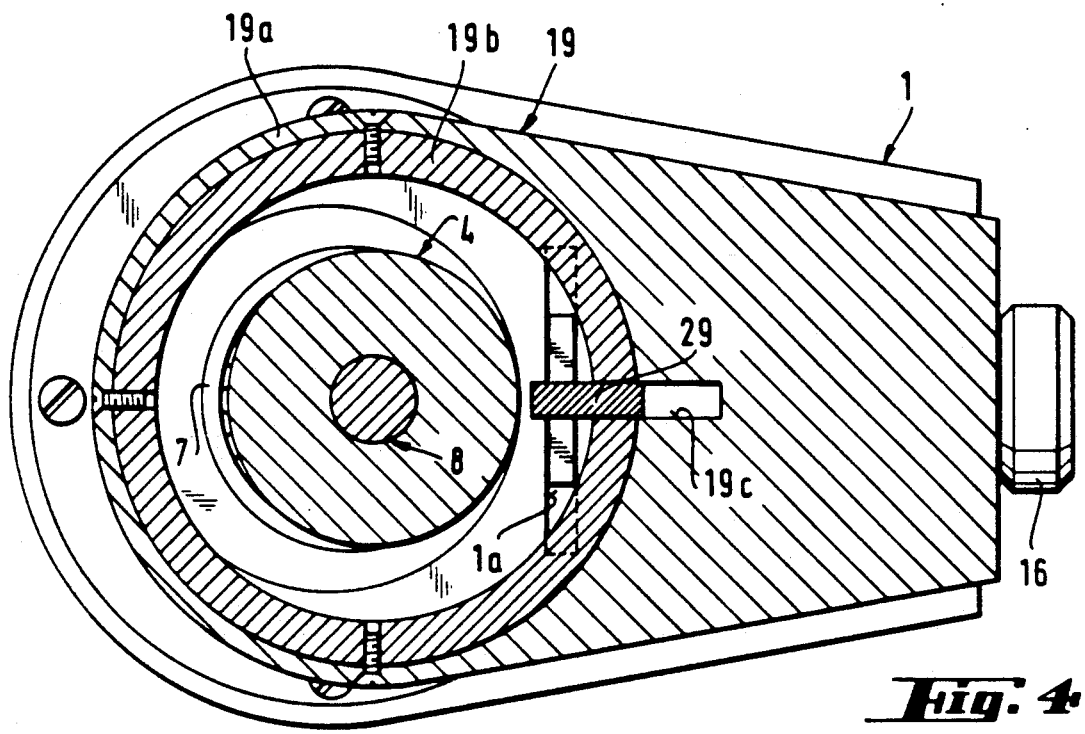
FIG. 4 is a cross-sectional view of the device taken along the line IV—IV in FIG. 1.

A guide yoke 29 is located between the upper or second end of the housing 1 and the lower end of the gear train housing 19. The function of the guide yoke 29 is shown particularly clearly in FIG. 4. An upper portion of guide yoke 29 is guided in a groove 19c extending in the long direction of the gear train housing, that is, transversely of the axial direction of the device. A lower portion of guide yoke 29 is fitted into a groove 1a in the housing 1 extending at a right angle with respect to the groove 19c. Accordingly, gear train housing 19 can be displaced relative to the housing 1 in its long direction and transversely of its long direction.

Figure 5:
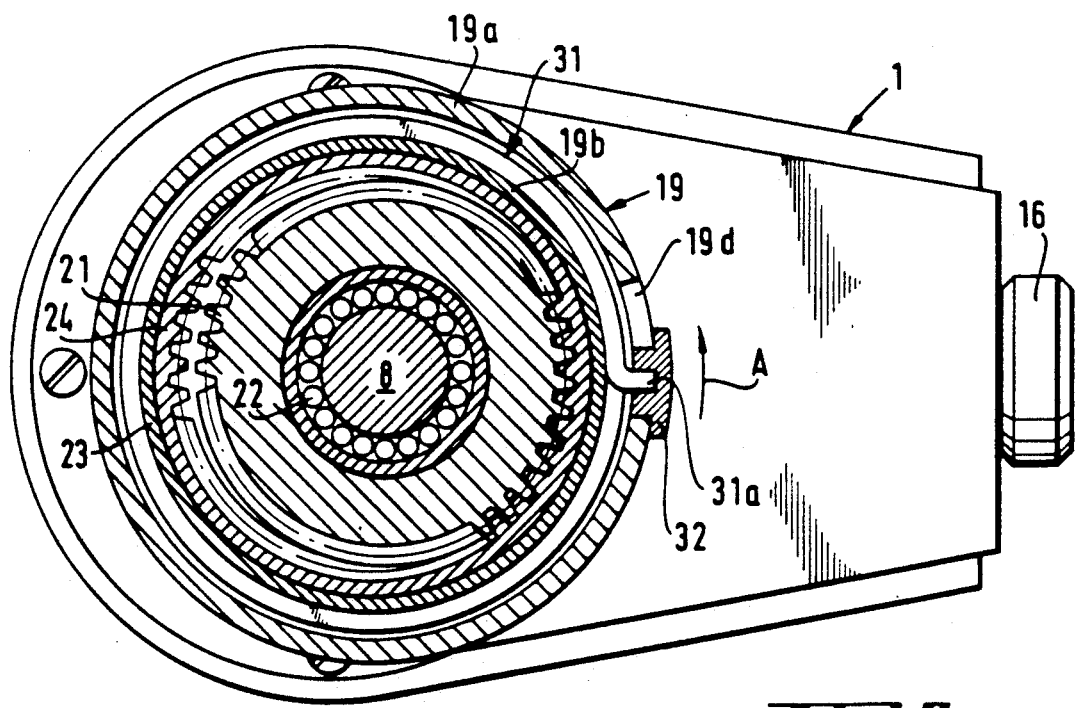
FIG. 5 is a cross-sectional view of the device taken along the line V—V in FIG. 1.

In the region adjacent the second end of the housing 1, a wrap-around spring 30 is located between the housing 1 and guide sleeve 2. Wrap-around spring 30 allows the guide sleeve to rotate only in one direction in the housing 1. A second wrap-around spring 31 is located within the gear train housing 19. Second wrap-around spring 31 forms a rotationally locked connection between the gear train housing 19 and the ring gear 23. As shown in FIG. 5, one end 31a of the wrap-around spring 31 is bent radially outwardly and projects into an aperture 19d of the gear train housing 19 and is connected to a slide 32 displaceable in the circumferential direction of the gear train housing. As a result, wrap-around spring 31 can be actuated externally of the gear train housing by the slide 32 secured on the one end 31a. If slide 32 is moved in the direction of the arrow A, the wrap-around spring 31 is released and moved in the unwinding direction so that the spring releases the circumferential surface of the ring gear 23. In this released condition, internal ring gear 23 can be rotated relative to the gear train housing 19. After the wrap-around spring 31 is released, the internal ring 23 can be rotated from the outside of the device by means of sheathing tube 28 connected to the ring gear 23. When the internal ring gear 23 is rotated, the internal ring gear 24 and the bushing 4 connected to it are rotated via the pair of gear wheels 20 and 21.

Figure 3:
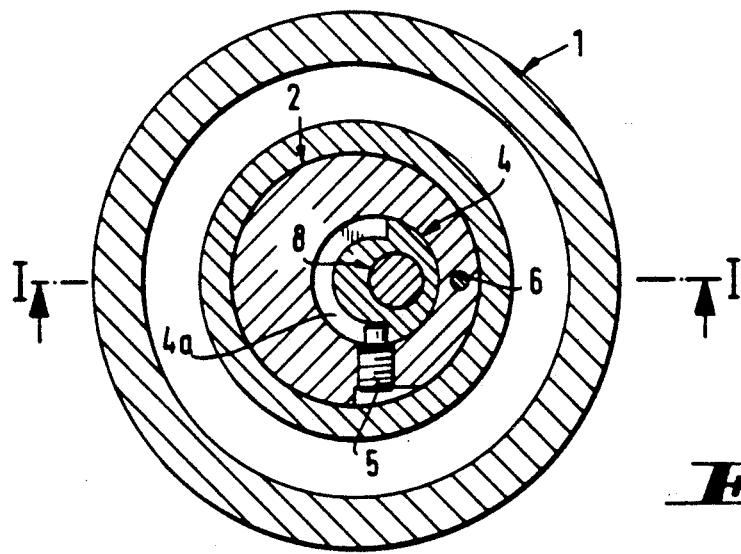
FIG. 3 is a cross-sectional view of the device taken along the line III—III in FIG. 1.

The device for drilling an undercut operates in the following manner:

Initially, knob 16 is pressed radially inwardly with the toggle lever 14 biasing the pawl 12 into engagement with the set of teeth 2a. In this position, the guide sleeve 2 cannot rotate. If the drive shaft 8 is driven, the bushing 4 is rotated relative to the guide sleeve by the eccentric gear train. The relative positions of the guide sleeve and the bushing are shown in FIG. 3. With the threaded pin 5 located at one end of the arcuately extending groove 4a, then the bushing 4 tends to entrain the guide sleeve 2. For such entrainment, the pawl 12 must be released from engagement with the set of teeth in the manner described. When the bushing 4 rotates with respect to the guide sleeve 2, the torsion spring 6 is stressed. With the movement of the bushing 4 relative to the guide sleeve 2, cutter head 9 on the drive shaft 8 is moved from the central position into the eccentric position and penetrates into the surface of the substrata in the borehole. With the locking action afforded by the pawl released, the guide sleeve 2 and the bushing 4 rotate together. Cutter head 9, carried along by the bushing 4, forms an undercut travelling for an angle of 360° or a full circle about the axis of the device. When the undercut has been completed, the resistance acting on the drive shaft dissipates and the torsion spring 6 can rotate the guide sleeve 2 relative to the bushing 4. Such relative rotation moves the cutter head 9 back into a centered position with respect to the guide sleeve 2. In this position, the device can be removed from the borehole.

If the guide sleeve 2 becomes jammed in the borehole, it is possible that the force of the torsion spring 6 is insufficient to rotate the guide sleeve 2 relative to the eccentric bushing 4 for returning the cutter head to a centered position. If such a situation exists, the wrap-around spring 31 can be unwound or released from its stressed condition by actuating the slide 32 whereby the rotationally locked connection between the internal ring 23 and the gear train housing 19 is cancelled. Bushing 4 can then be rotated from outside the device by means of the sheathing tube 28, internal ring 23, gear wheels 20, 21 and internal ring gear 24, whereby the drive shaft 8 and its cutter head 9 is centered within the guide sleeve 2. To afford relative rotation between the bushing 4 and the guide sleeve 2, guide sleeve 2 is held against rotational entrainment by the wrap-around spring 30. After the slide 32 is released, the wrap-around spring 31 returns into contact with the internal ring gear 23. Such movement assures the rotationally locked connection between the internal ring gear 23 and the gear train housing 19, which is necessary for the correct operation of the eccentric gear train.

While specific embodiments of the invention have been shown and described in detail to illustrate the application of the inventive principles, it will be understood that the invention may be embodied otherwise without departing from such principles.

I claim:

1. A device for drilling an undercut in a borehole formed into a substrata comprising a housing (1) having a first end and a second end with the first end arranged to abut against a surface into which the borehole is formed, an axially extending guide sleeve (2) located within said housing and having a first end extending axially from the first end of said housing, said guide sleeve (2) has a first eccentric bore therethrough parallel to the axis thereof, an axially extending bushing (4) located within said first eccentric bore and having a second eccentric bore therethrough parallel to the axis of said bushing, said bushing is rotatable relative to said guide sleeve, means for limiting rotatable movement of said bushing relative to said guide sleeve to an angular displacement of approximately 180°, a drive shaft (8) rotatably supported in said second eccentric bore and extending axially from the first end of said guide sleeve, said drive shaft having a first end extending axially outwardly from said bushing, a cutter head (9) secured to the first end of said drive shaft, a torsional spring (6) encircling said bushing and located between said bushing and said guide sleeve and being stressed by relative rotation between said bushing and guide sleeve, means for providing rotational arrest between said guide sleeve (2) and housing (1), and an eccentric gear train located within an eccentric gear train housing (19) and located at the second end of said housing, said eccentric gear train including an internal ring gear (23) connected to said gear train housing (19) and located between said drive shaft (8) and said bushing (4), wherein the improvement comprises a releasable interconnection element located between said internal ring gear (23) and said gear train housing (19) for providing a rotationally locked connection therebetween, and said internal ring gear (23) is rotatable from exteriorly of said gear train housing, and said internal ring gear (23) has a section extending axially outwardly from said gear train housing (19) and a sheathing (28) enclosing a flexible shaft (27) for driving said drive shaft is secured to the section of said internal ring gear (23).

2. A device, as set forth in claim 1, wherein said interconnection element is a wrap-around spring (31) connectable with said gear train housing (19) and said internal ring gear (23).

3. A device for drilling an undercut in a borehole formed into a substrata comprising a housing (1) having a first end and a second end with the first end arranged to abut against a surface into which the borehole is formed, an axially extending guide sleeve (2) located within said housing and having a first end extending axially from the first end of said housing, said guide sleeve (2) has a first eccentric bore therethrough parallel to the axis thereof, an axially extending bushing (4) located within said first eccentric bore and having a second eccentric bore therethrough parallel to the axis of said bushing, said bushing is rotatable relative to said guide sleeve, means for limiting rotatable movement of said bushing relative to said guide sleeve to an angular displacement of approximately 180°, a drive shaft (8) rotatably supported in said second eccentric bore and extending axially from the first end of said guide sleeve, said drive shaft having a first end extending axially outwardly from said bushing, a cutter head (9) secured to the first end of said drive shaft, a torsional spring (6) encircling said bushing and located between said bushing and said guide sleeve and being stressed by relative rotation between said bushing and guide sleeve, means for providing rotational arrest between said guide sleeve (2) and housing (1), and an eccentric gear train located within an eccentric gear train housing (19) and located at the second end of said housing, said eccentric gear train including an internal ring gear (23) connected to said gear train housing (19) and located between said drive shaft (8) and said bushing (4), wherein the improvement comprises a releasable interconnection element located between said internal ring gear (23) and said gear train housing (19) for providing a rotationally locked connection therebetween, and said internal ring gear (23) is rotatable from exteriorly of said gear train housing, and said internal ring gear (23) has a section extending axially outwardly from said gear train housing (19) and a sheathing tube (28) enclosing a flexible shaft (27) for driving said drive shaft is secured to the section of said internal ring gear (23), said interconnection element is a wrap-around spring (31) connectable with said gear train housing (19) and said internal ring gear (23), said wrap-around spring (31) has an end bent radially outwardly and extending through an aperture in said gear train housing to a position accessible on the outside of said device, a slide (32) secured to the end of said spring, said slide being displaceable in the aperture of said gear train housing (19) in the circumferential direction of said gear train housing for releasing said spring (31) from contact with said internal ring gear (23).

* * * * *